(12) United States Patent
Rode et al.

(10) Patent No.: US 11,964,371 B2
(45) Date of Patent: *Apr. 23, 2024

(54) SYSTEMS AND METHODS FOR PRELOADING A BEARING AND ALIGNING A LOCK NUT

(71) Applicant: TEMPER AXLE PRODUCTS CORPORATION, Fonda, NY (US)

(72) Inventors: John E. Rode, Fonda, NY (US); Sean E. Strait, Fort Plain, NY (US)

(73) Assignee: Temper Axle Products Corporation, Fonda, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/655,879

(22) Filed: Mar. 22, 2022

(65) Prior Publication Data

US 2022/0212323 A1 Jul. 7, 2022

Related U.S. Application Data

(60) Continuation of application No. 16/679,956, filed on Nov. 11, 2019, now Pat. No. 11,305,408, which is a
(Continued)

(51) Int. Cl.
*B25B 27/06* (2006.01)
*B23P 19/10* (2006.01)
(Continued)

(52) U.S. Cl.
CPC ............ *B25B 27/062* (2013.01); *F16B 39/10* (2013.01); *F16B 39/12* (2013.01); *F16C 25/06* (2013.01);
(Continued)

(58) Field of Classification Search
CPC ....... B23P 19/02; B23P 19/027; B23P 19/065; B23P 19/06; B23P 19/10; B23P 19/102;
(Continued)

(56) References Cited

U.S. PATENT DOCUMENTS

| 518,328 A | 4/1894 | Oakey |
| 578,276 A | 2/1897 | Strauss |

(Continued)

FOREIGN PATENT DOCUMENTS

| DE | 3905385 A1 | 8/1990 |
| EP | 1367299 A2 | 3/2003 |

(Continued)

OTHER PUBLICATIONS

Stemco—Pro-Torq Advanced Axle Spindle Nuts, Installation Procedure and Wheel Bearing Adjustment.
(Continued)

*Primary Examiner* — Christopher J Besler
(74) *Attorney, Agent, or Firm* — Heslin Rothenberg Farley & Mesiti P.C.; Nicholas Mesiti, Esq.; Victor A. Cardona, Esq.

(57) ABSTRACT

An apparatus for providing a load on a bearing mounted to a shaft includes an attaching member releasably connectable to the shaft. A press mechanism is coupled to the attaching member and is configured to provide a compressive load to the bearing. An optical sending unit is configured to output a high intensity light to allow a user to locate a shaft slot of the shaft to align the press mechanism relative to the shaft when the attaching member connects to the shaft.

5 Claims, 9 Drawing Sheets

Related U.S. Application Data continuation of application No. 15/885,988, filed on Feb. 1, 2018, now Pat. No. 10,493,605, which is a division of application No. 15/071,570, filed on Mar. 16, 2016, now Pat. No. 9,908,223.

(51) Int. Cl.
*F16B 39/10* (2006.01)
*F16B 39/12* (2006.01)
*F16C 25/06* (2006.01)
*F16C 43/04* (2006.01)

(52) U.S. Cl.
CPC .............. *F16C 43/04* (2013.01); *B23P 19/10* (2013.01); *F16C 2226/80* (2013.01); *F16C 2229/00* (2013.01); *F16C 2326/02* (2013.01); *F16C 2361/31* (2013.01)

(58) Field of Classification Search
CPC ..... B23P 19/105; B25B 27/06; B25B 27/064; B25B 27/062; F16B 39/12; F16B 39/28; F16C 43/04; F16C 43/045; F16C 2229/00
See application file for complete search history.

(56) References Cited

U.S. PATENT DOCUMENTS

| | | |
|---|---|---|
| 1,352,643 A | 9/1920 | Young |
| 1,366,273 A | 1/1921 | Nettlefold |
| 1,373,489 A | 4/1921 | Royal-Cochran |
| 1,384,655 A | 7/1921 | Allmon |
| 1,440,938 A | 1/1923 | Sieroslawski |
| 1,755,807 A | 4/1930 | Boles |
| 1,758,515 A | 5/1930 | Heiermann |
| 1,813,640 A | 7/1931 | Rossetti |
| 2,301,786 A | 11/1942 | Millermaster |
| 2,426,219 A | 8/1947 | Jackson |
| 2,755,698 A | 7/1956 | Wurzel |
| 2,769,360 A | 11/1956 | Woodford |
| 2,813,732 A | 11/1957 | Hird |
| 3,144,909 A | 8/1964 | Hart et al. |
| 3,241,409 A | 3/1966 | Raptis |
| 3,316,952 A | 5/1967 | Hollinger |
| 3,464,474 A | 9/1969 | Jansen |
| 3,480,300 A | 11/1969 | Jeffrey et al. |
| 3,522,830 A | 4/1970 | Blizard |
| 3,566,721 A | 3/1971 | Nockleby |
| 3,581,609 A | 6/1971 | Greenwood |
| 3,620,108 A | 11/1971 | Door |
| 3,664,226 A | 5/1972 | Gonzalez |
| 3,678,981 A | 7/1972 | Heyworth |
| 3,762,455 A | 2/1973 | Anderson, Jr. |
| 3,742,568 A | 7/1973 | Hahlbeck |
| 3,844,323 A | 10/1974 | Anderson, Jr. |
| 3,986,750 A | 10/1976 | Trent et al. |
| 4,048,897 A | 9/1977 | Price, Jr. |
| 4,054,999 A | 10/1977 | Harbottle |
| 4,210,372 A | 1/1980 | McGee et al. |
| 4,305,438 A | 12/1981 | Spinosa et al. |
| 4,436,468 A | 3/1984 | Ozaki et al. |
| 4,593,924 A | 10/1986 | Cabeza |
| 4,642,866 A | 2/1987 | Murtaugh |
| 4,689,865 A | 9/1987 | Chamblee |
| 4,812,094 A | 3/1989 | Grube |
| 4,958,941 A | 9/1990 | Imanari |
| 4,971,501 A | 11/1990 | Chavez |
| 5,011,306 A | 4/1991 | Martinie |
| 5,058,424 A | 10/1991 | O'Hara |
| 5,070,621 A | 12/1991 | Butler et al. |
| 5,129,156 A | 7/1992 | Walker |
| 5,180,265 A | 1/1993 | Weise |
| 5,251,995 A | 10/1993 | Chi |
| 5,348,349 A | 9/1994 | Sloane |
| 5,349,736 A | 9/1994 | Rubino et al. |
| 5,362,111 A | 11/1994 | Harbin |
| 5,366,300 A | 11/1994 | Deane et al. |
| 5,533,849 A | 7/1996 | Burdick |
| 5,535,517 A | 7/1996 | Rode |
| 5,573,311 A | 11/1996 | Clohessy |
| 5,597,058 A | 1/1997 | Ewer |
| 5,749,386 A | 5/1998 | Samuel, Jr. |
| 5,877,433 A | 3/1999 | Matsuzaki et al. |
| 5,882,044 A | 3/1999 | Sloane |
| 5,934,853 A | 8/1999 | Junkers |
| 6,042,273 A | 3/2000 | Thrasher |
| 6,058,767 A | 5/2000 | Calvin |
| 6,065,920 A | 5/2000 | Becker et al. |
| 6,095,735 A | 8/2000 | Weinstein et al. |
| 6,135,642 A | 10/2000 | Burch |
| 6,186,032 B1 | 2/2001 | Raines |
| 6,264,284 B1 | 7/2001 | Lees |
| 6,286,374 B1 | 9/2001 | Kudo et al. |
| 6,520,710 B2 | 2/2003 | Wells |
| 6,598,500 B1 | 7/2003 | Chivington-Wells |
| 6,601,503 B2 | 8/2003 | Scholzig et al. |
| 6,622,397 B1 | 9/2003 | Knoble |
| 6,637,297 B1 | 10/2003 | Mlynarczyk |
| 6,749,386 B2 | 6/2004 | Harris |
| 6,857,665 B2 | 2/2005 | Vyse et al. |
| 6,886,227 B1 | 5/2005 | Hedrick |
| 6,971,802 B2 | 12/2005 | Vezina |
| 6,976,816 B2 | 12/2005 | Slesinski et al. |
| 6,976,817 B1 | 12/2005 | Grainger |
| 6,988,832 B2 | 1/2006 | Dewachter |
| 6,993,852 B2 | 2/2006 | Russell et al. |
| 7,226,259 B2 | 6/2007 | Harris |
| 7,270,509 B2 | 9/2007 | Disantis et al. |
| 7,303,367 B2 | 12/2007 | Rode |
| 7,343,836 B1 | 3/2008 | Ward |
| 7,346,985 B1 | 3/2008 | Strait |
| 7,389,579 B2 | 6/2008 | Rode |
| 7,428,779 B2 | 9/2008 | Smith et al. |
| 7,559,135 B2 | 7/2009 | Rode |
| 7,625,164 B2 | 12/2009 | Rode |
| 7,757,586 B2 | 7/2010 | Winker et al. |
| 7,927,052 B1 | 4/2011 | Varden |
| 8,006,573 B2 | 8/2011 | Rode |
| 8,172,496 B2 | 5/2012 | Vile et al. |
| 8,261,457 B1 | 9/2012 | Peters |
| 8,316,530 B2 | 11/2012 | Rode |
| 8,328,486 B2 | 12/2012 | Cox |
| 8,359,733 B2 | 1/2013 | Rode |
| 8,650,757 B2 | 2/2014 | Rode |
| 8,904,646 B2 | 12/2014 | Rode |
| 8,961,090 B2 | 2/2015 | Rode |
| 9,200,672 B2 | 12/2015 | Rode |
| 9,200,673 B2 | 12/2015 | Rode |
| 9,217,461 B2 | 12/2015 | Rode |
| 9,574,612 B2 | 2/2017 | Rode |
| 9,618,049 B2 | 4/2017 | Rode |
| 9,651,094 B2 | 5/2017 | Rode |
| 9,797,441 B2 | 10/2017 | Rode |
| 9,908,223 B2 | 3/2018 | Rode et al. |
| 9,987,732 B2 | 6/2018 | Rode et al. |
| 10,100,872 B1 | 10/2018 | Rode et al. |
| 10,837,489 B2 | 11/2020 | Rode et al. |
| 11,305,408 B2 * | 4/2022 | Rode .................... B25B 27/062 |
| 2004/0089113 A1 | 5/2004 | Morgan |
| 2014/0290065 A1 | 10/2014 | Rode |
| 2017/0152883 A1 | 6/2017 | Rode |
| 2017/0266792 A1 | 9/2017 | Rode |
| 2018/0161967 A1 | 6/2018 | Rode et al. |

FOREIGN PATENT DOCUMENTS

| | | |
|---|---|---|
| GB | 990553 A | 4/1965 |
| GB | 2286231 A | 6/1995 |
| GB | 2435499 B | 1/2007 |
| GB | 2434621 B | 10/2008 |
| WO | 02/08618 A1 | 1/2002 |
| WO | 2008/003919 A1 | 1/2008 |
| WO | 2015/147903 A1 | 10/2015 |

(56) References Cited

FOREIGN PATENT DOCUMENTS

OTHER PUBLICATIONS

"STEMCO Pro-Torq® Advanced Axle Spindle Nuts 09-571-0006," Instruction guide, Copyright Aug. 2003, 2 pages.
"STEMCO Pro-Torq(R) 571-2970," Copyright 2005 STEMCO LP, 2 pages.
"Timkin Products-Bearings," vol. 1, Issue 6; 2 pages, [http://www.timken.com/products/bearings/techtips/tip6.asp].
Timkin Tech Tips: Promoting Safe, Proper Bearing Handling Practices for the Heavy-Duty Market; "Preload in Wheel Bearings" vol. 6, Issue 3, 2 pages, http://www.dtcomponents.com/files/vol6no3.pdf.
"Forming and Shaping Processes Compaction and Sintering (Pulvepresning)," Copyright Institut for Precesteknik Danmarks Tekniske Universitet 1996, (http://www.ipt.dtusdk/-ap/ingpro/ forming/ ppm/htm).
STEMCO, PRO-TORQ, An Axle Spindle Nut System for Today's Fleets. Mar. 2003; download from http://www.stemco.com, pp. 38-41.
STEMCO, PRO-TORQ, An Axle Spindle Nut System for Today's Fleets. Mar. 2003; download from http://www.stemco.com, pp. 57-64.
What is Powder Metallurgy? Dec. 2004, 2 pages. (htttps://www.mpif org/technology/whatis.html).
www.stemco.com/f/qbin/Quick_Reference_Catalog.pdf—STEMCO Quality Bearing Reference Guide—Table of Contents. Complete document available at http://www.stemco.com/literature-download/.
http://www.stemco.com/product/pro-torz-axle-spindle-nuts/—Stemco—Pro-Torq® Axle Spindle Nuts.
Stemco, Quick Reference Catalog 572-0011 Rev. Date Apr. 2010.
Stemco—Pro-Torq, Axle Spindle Nuts, an Axle Spindle Nut System for Today's Commercial Fleets (http://www.stemco.com/product/pro-torz-axle-spindle-nuts/.

\* cited by examiner

SYSTEMS AND METHODS FOR PRELOADING A BEARING AND ALIGNING A LOCK NUT

CROSS-REFERENCE TO RELATED APPLICATION

This application is a continuation of U.S. Ser. No. 16/679,956 filed on Nov. 11, 2019, entitled "Systems and Methods for Preloading a Bearing and Aligning a Lock Nut", published as U.S. Publication No. 2020/0078913-A1 on Mar. 12, 2020, which is a continuation of U.S. Ser. No. 15/885,988 filed on Feb. 1, 2018, entitled "Systems and Methods for Preloading a Bearing and Aligning a Lock Nut", published as U.S. Publication No. 2018/0161967-A1 on Jun. 14, 2018, which is a divisional of U.S. Ser. No. 15/071,570 filed on Mar. 16, 2016, entitled "Systems and Methods for Preloading a Bearing and Aligning a Lock Nut", published as U.S. Publication No. 2017/0266792 A1 on Sep. 21, 2017. The entire disclosure of these applications is incorporated herein by reference.

This application is related to U.S. Ser. No. 12/492,826 filed on Jun. 26, 2009, entitled "Systems and Methods for Preloading a Bearing and Aligning a Lock Nut", now U.S. Pat. No. 8,316,530 issued on Nov. 27, 2012, the entire disclosure of which is incorporated herein by reference.

This application also relates to U.S. Ser. No. 13/683,571, filed on Nov. 21, 2012, entitled "Methods for Preloading a Bearing and Aligning a Lock Nut", now U.S. Pat. No. 8,650,752 issued on Feb. 18, 2014, the entire disclosure of which is incorporated herein by reference.

This application also relates to U.S. Ser. No. 14/160,045, filed on Jan. 21, 2015, entitled "Systems and Methods for Preloading a Bearing and Aligning a Lock Nut", now U.S. Pat. No. 8,904,646 issued on Dec. 9, 2014, the entire disclosure of which is incorporated herein by reference.

This application also relates to U.S. application Ser. No. 11/341,948, filed Jan. 27, 2006, and titled "Method and Apparatus for Preloading a Bearing", issued as U.S. Pat. No. 7,559,135 on Jul. 14, 2009, the entire disclosure of which is incorporated herein by reference.

This application also relates to U.S. application Ser. No. 11/354,513, filed Feb. 15, 2006, and titled "Method, Apparatus, and Nut for Preloading a Bearing", issued as U.S. Pat. No. 7,389,579 on Jun. 24, 2008, the entire disclosure of which is incorporated herein by reference.

This application also relates to U.S. Ser. No. 12/033,548, filed on Feb. 19, 2008, entitled "Axle Nut", now U.S. Pat. No. 8,961,090 issued on Feb. 24, 2015, the entire disclosure of which is incorporated herein by reference.

This application also relates to U.S. Ser. No. 12/492,926, filed Jun. 26, 2009, entitled "Methods for Preloading a Bearing", now U.S. Pat. No. 8,359,733 issued on Jan. 29, 2013, the entire disclosure of which is incorporated herein by reference.

This application also relates to U.S. Ser. No. 14/305,830, filed Jun. 16, 2014, entitled "Lock Nut System", now U.S. Pat. No. 9,200,673 issued on Dec. 1, 2015, the entire disclosure of which is incorporated herein by reference.

This application also relates to U.S. Ser. No. 14/305,673, filed Jun. 16, 2014, entitled "Method, Apparatus, and Nut for Preloading A Bearing", now U.S. Pat. No. 9,200,672 issued on Dec. 1, 2015, the entire disclosure of which is incorporated herein by reference.

This application also relates to U.S. Ser. No. 14/814,086, filed Jul. 30, 2015, entitled "Apparatus for Preloading A Bearing", now U.S. Pat. No. 9,618,049 issued on Apr. 11, 2017, the entire disclosure of which is incorporated herein by reference.

This application also relates to U.S. Ser. No. 14/852,100, filed Sep. 11, 2015, entitled "Method, Apparatus, and Nut for Bearing", now U.S. Pat. No. 9,651,094 issued on May 16, 2017, the entire disclosure of which is incorporated herein by reference.

This application also relates to U.S. Ser. No. 14/952,663, filed Nov. 25, 2015, entitled Method, Apparatus, and Nut for Bearing", now U.S. Pat. No. 9,574,612 issued on Feb. 21, 2017, the entire disclosure of which is incorporated herein by reference.

This application also relates to U.S. Ser. No. 15/441,520, filed Feb. 24, 2017, entitled "Method for Preloading a Bearing", now U.S. Pat. No. 9,797,441 issued on Oct. 24, 2017, the entire disclosure of which is incorporated herein by reference.

This application also relates to U.S. Ser. No. 15/714, filed Sep. 25, 2017, entitled "Apparatus for Preloading a Bearing", the entire disclosure of which is incorporated herein by reference.

This application is also related to U.S. Ser. No. 14/533,143, filed on Aug. 8, 2014, entitled "Systems and Methods for Preloading a Bearing and Aligning a Lock Nut", now U.S. Pat. No. 9,217,461 issued on Dec. 22, 2015, the entire disclosure of which is incorporated by reference);

This application is also related to U.S. Ser. No. 14/946,168, filed on Nov. 19, 2015, entitled "Systems and Methods for Preloading a Bearing and Aligning a Lock Nut", now U.S. Pat. No. 9,587,667 issued on Mar. 7, 2017, the entire disclosure of which is incorporated by reference);

This application is also related to U.S. Ser. No. 15/418,315, filed on Jan. 27, 2017, entitled "Systems and Methods for Preloading a Bearing and Aligning a Lock Nut", published as U.S. Publication No. US-2017-0152883-A1 on Jun. 1, 2017, the entire disclosure of which is incorporated by reference);

This application is also related to U.S. Ser. No. 15/880,008, filed on Jan. 25, 2018, entitled "Systems and Methods for Preloading a Bearing and Aligning a Lock Nut", the entire disclosure of which is incorporated by reference);

This application also relates to U.S. Ser. No. 15/071,584, filed Mar. 16, 2016, entitled "Systems and Methods for Preloading a Bearing", now U.S. Pat. No. 9,599,164 issued on Mar. 21, 2017, the entire disclosure of which is incorporated herein by reference.

This application also relates to U.S. Ser. No. 15/416,683, filed Jan. 26, 2017, entitled "Systems and Methods for Preloading a Bearing", published as U.S. Publication No. US-2017-0268572-A1 on Sep. 21, 2017, the entire disclosure of which is incorporated herein by reference.

This application also relates to U.S. Ser. No. 15/071,753, filed Mar. 16, 2016 entitled "System and Methods for Preloading a Bearing", now U.S. Pat. No. 9,764,453 issued on Sep. 19, 2017, the entire disclosure of which is incorporated herein by reference.

This application also relates to U.S. Ser. No. 15/661,808, filed Jul. 27, 2017, entitled "Systems and Methods for Preloading a Bearing", published as U.S. Publication No. US-2017-0320203-A1 on Nov. 9, 2017, the entire disclosure of which is incorporated herein by reference.

TECHNICAL FIELD

The present invention relates, generally, to methods and apparatus for preloading antifriction bearings in drive trains, particularly, to preloading and adjusting bearings while monitoring the preload being applied.

BACKGROUND OF THE INVENTION

Various means have been devised to simplify the adjustment of axle bearings, specifically, truck axle bearings. It is generally accepted that in some bearing installations, for example, axle bearings, the life of the bearing will be optimized if the adjustment is made for a slight axial compressive deflection, for example, about 0.003 inches (where this amount is the compressive deflection of the two bearings combined), which is often referred to as "a three thousandths preload." Typical prior art methods of creating these preloads are obtained by applying specified torques to the bearing assembly, for example, by tightening the nut that retains the bearings. However, for several reasons, it is typically extremely difficult to achieve such preload settings under actual in-field conditions, such as in a mechanic shop. For example, the assembly of a heavy truck wheel onto a wheel hub assembly is a relatively cumbersome procedure that hinders the mechanic. Moreover, the wheel hub assembly always includes at least one inner seal, usually a lip type of seal, which can impose a resistive drag torque component to the preload torque, particularly when the seal is new.

Lock nut systems are often utilized to retain a wheel or hub assembly, including axle bearings, on a shaft. Such lock nut systems may be connected to a shaft and inhibit rotation of a retaining nut relative to such shafts. For example, such systems are often utilized on motor vehicles, such as axles and wheel ends. Typically, a lock nut will be engageable with a locking member or keeper which inhibits movement of the nut relative to the shaft. The locking member may include a protruding portion which extends into a slot or receiving portion of a shaft. The locking member may also engage the nut such that there is little or no movement between the nut and shaft.

It is important that teeth of a locking member engage teeth of the lock nut such that the locking member is positioned to allow it to engage a slot of the shaft. The nut must be aligned to allow such engagement by selective rotation of the nut to a particular position such that the teeth of the nut and the teeth of the locking member when engaged allow an engaging portion of the locking member to engage a slot of the shaft. Rotation of the nut may be performed during the preloading of a bearing and the degree of rotation allowed may depend on the amount of compressive force applied to a bearing or hub during the preloading of the bearing and the method of application of such force.

Thus, a need exists for providing accurate and repeatable procedures and devices for providing and adjusting bearing preload and for adjusting lock nut systems configured to retain preloaded bearings.

SUMMARY OF THE INVENTION

The present inventor provides, in a first aspect, an apparatus for providing a load on a bearing mounted to a shaft which includes an attaching member releasably connectable to the shaft. A press mechanism is coupled to the attaching member and is configured to provide a compressive load to the bearing. An optical sending unit is configured to output a high intensity light to allow a user to locate a shaft slot of the shaft to align the press mechanism relative to the shaft when the attaching member connects to the shaft.

The present invention provides, in a second aspect, a method for use in providing a load on a bearing mounted to a shaft which includes mounting an attaching mechanism to an end of the shaft. A press mechanism is coupled to the attaching member and is configured to provide a compressive load to the bearing. A high intensity light is directed from a sending unit towards the shaft. A shaft slot of the shaft is aligned with the light beam to align the press mechanism relative to the shaft.

The present invention provides, in a third aspect, an apparatus for providing a load on a bearing mounted to a shaft which includes an attaching member releasably connectable to the shaft. A press mechanism is coupled to the attaching member and is configured to provide a compressive load to the bearing. The press mechanism includes a wrench engageable with a lock nut on the shaft and is configured to rotate the nut when the attaching member connects to the shaft.

The present invention provides, in a fourth aspect, a method for use in providing a load on a bearing mounted to a shaft which includes mounting an attaching mechanism to an end of the shaft. A press mechanism is coupled to the attaching member and is configured to provide a compressive load to the bearing. A wrench of the press mechanism is engaged with the lock nut on the shaft and the wrench rotates the nut.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention will be readily understood from the following detailed description of aspects of the invention taken in conjunction with the accompanying drawings in which:

DETAILED DESCRIPTION OF THE INVENTION

In accordance with the principals of the present invention, system and methods for adjusting bearings mounted on a shaft and aligning lock nuts for retaining such bearings are provided.

Figure 1:
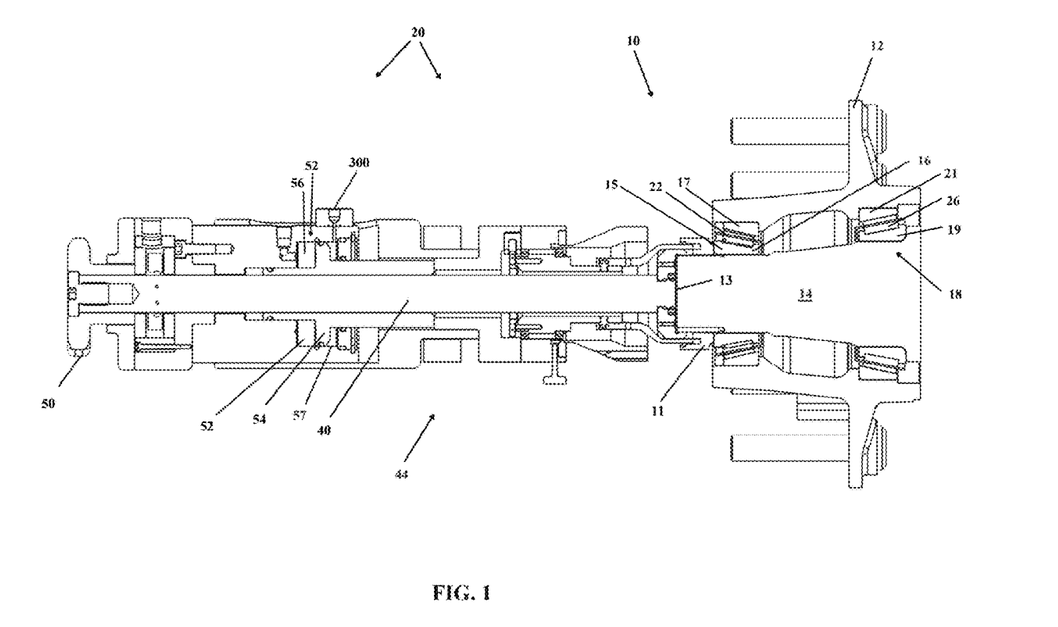
FIG. 1 is a right side elevation view, partially in cross section, of a wheel hub assembly engaging a bearing preload apparatus according to one aspect of the invention.

In an exemplary embodiment depicted in FIG. 1, a wheel hub assembly 10 engages a bearing preload apparatus 20. Some of a section of the hardware has been removed to reveal inner structure to facilitate disclosure of the invention. For the sake of illustration, the wheel assembly that would typically be mounted to wheel hub assembly 10 is omitted in these figures.

Wheel hub assembly 10 is an assembly that would typically be found on a front or rear axle of a cab or tractor of a tractor-trailer, or an axle of a trailer. However, aspects of the invention are not limited to use for vehicle bearings. As will generally be understood by those skilled in the art, aspects of the invention may be used to service bearings and bearing assemblies in any machine or device that employs bearings, including, but not limited to: power trains, transmissions, machine components, on and off-road vehicles, aircraft wheels, marine drives, spacecraft, conveyor rolls, and windmills, among others. According to aspects of the present invention, preload apparatus 20 may be used in these and any other assembly for which bearing preload and/or endplay is desired, for example, any assembly that utilizes thrust and radial load carrying bearings that are indirectly mounted.

As shown in FIG. 1-4, for example, wheel hub assembly 10 includes a wheel hub or, simply, a hub 12, a threaded shaft, axle, or spindle 14. As is typical, spindle 14 is mounted on two antifriction bearings and spindle 14 includes an exposed end 13, which is typically threaded. Spindle 14 typically includes a retaining nut 11 threaded to exposed end 13.

Figure 2:
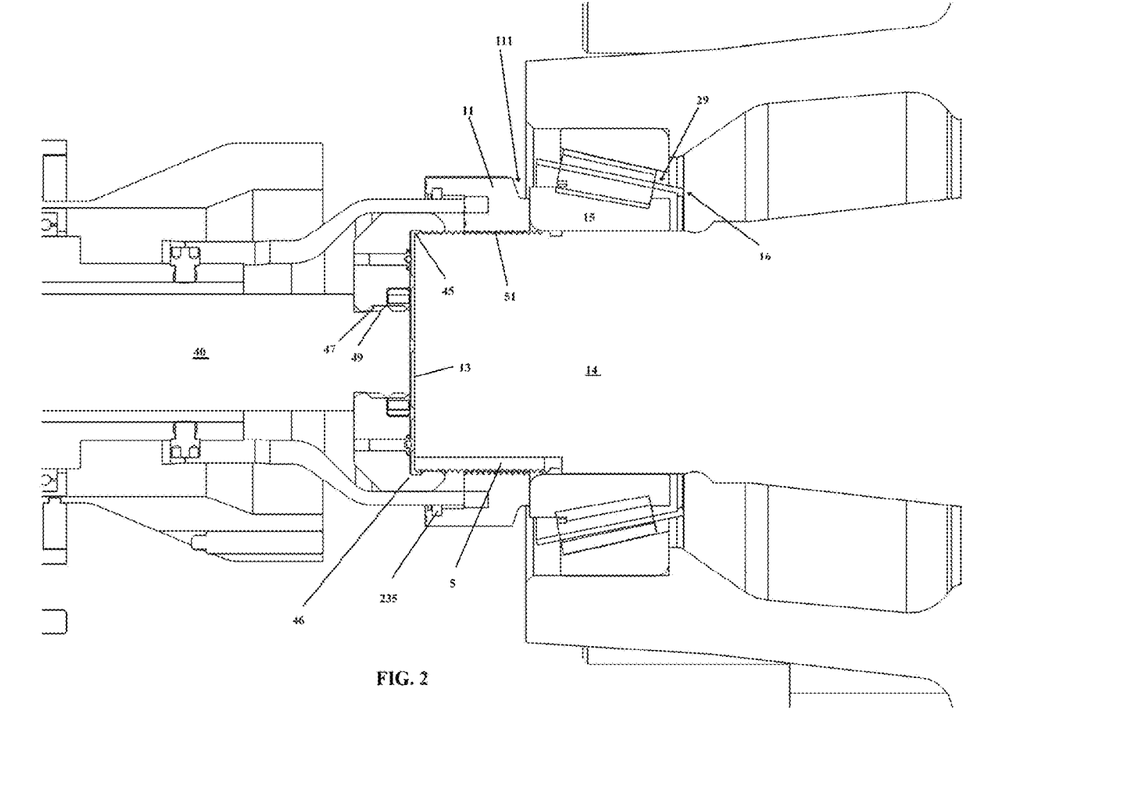
FIG. 2 is a close up view of a portion of FIG. 1.
Figure 3:
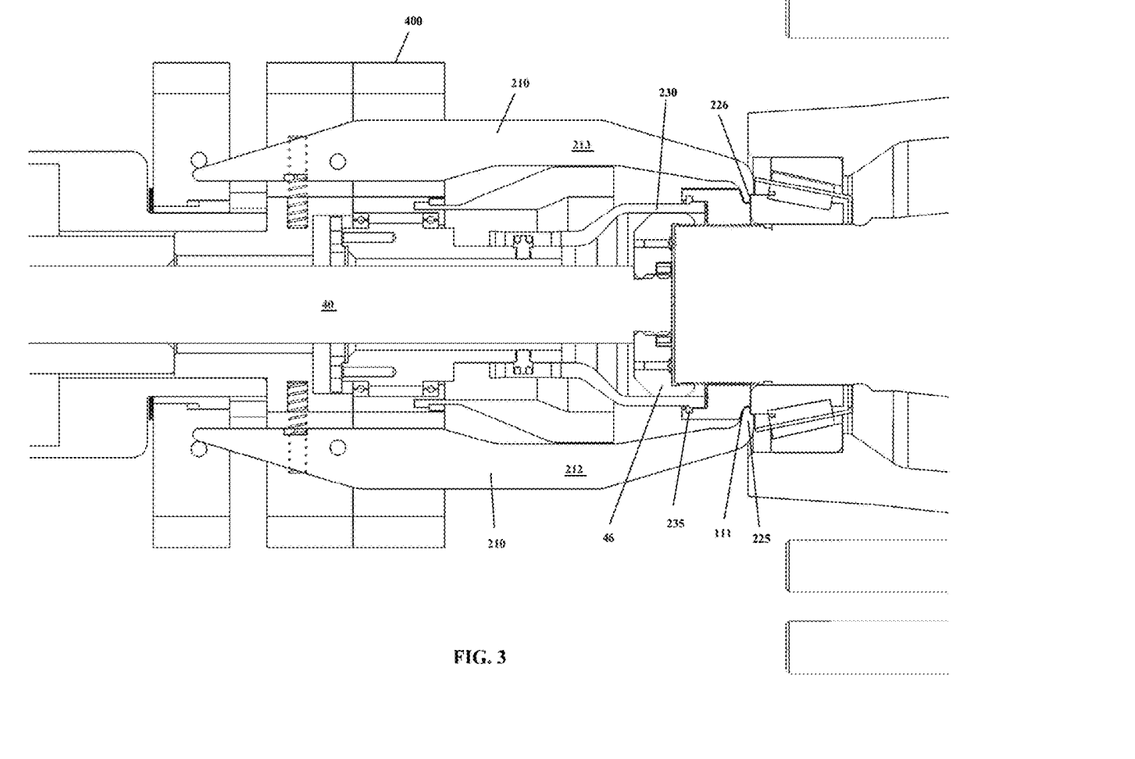
FIG. 3 is a top plan view, partially in cross section of a portion of the assembly shown in FIG. 1.
Figure 4:
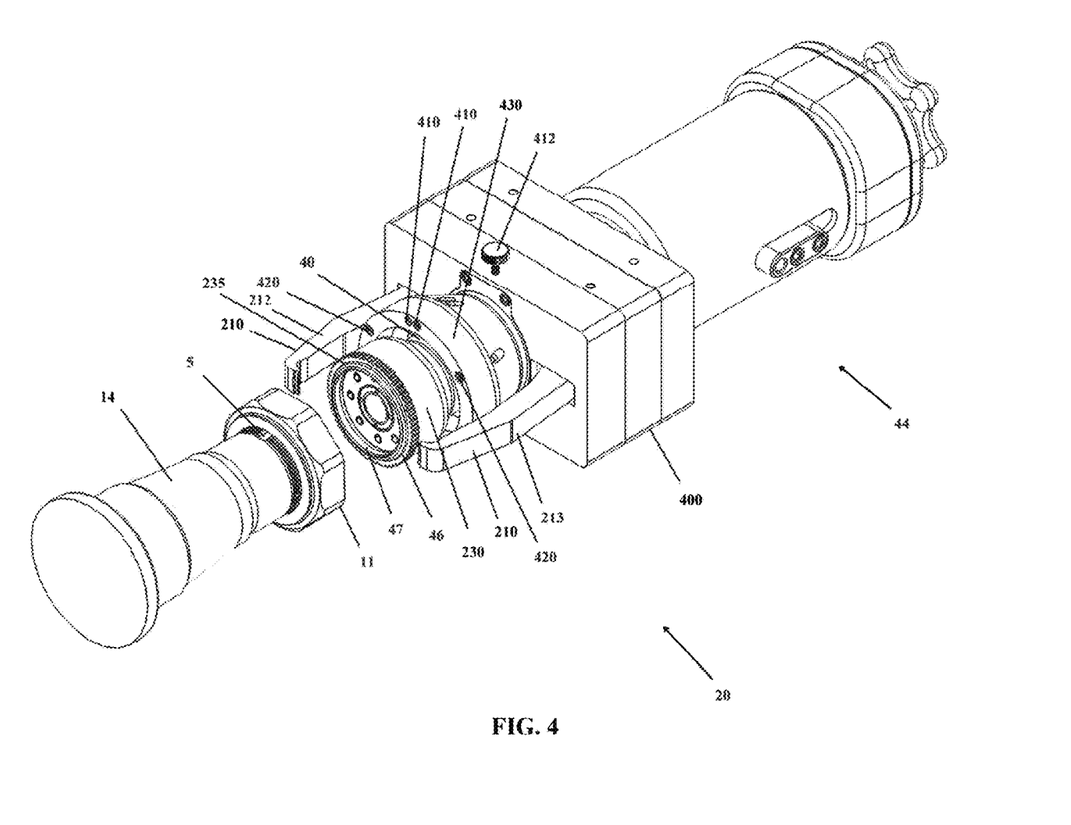
FIG. 4 is an exploded perspective view of the assembly of FIG. 1 with portions of the wheel hub assembly removed.

As shown in FIGS. 1-3, as is typical of bearings, an outboard bearing 16 includes an inner race (or cone) 15, an outer race (or cup) 17, a plurality of rollers 22, and a roller cage. Similarly, an inboard bearing 18 includes an inner race (or cone) 19, an outer race (or cup) 21, a plurality of rollers 26, and roller cage. As shown in FIG. 2, outboard bearing 16 is positioned, for example, by an interference fit, into an annular cavity 29. The details of an inboard bearing and an outboard bearing are described and depicted in co-owned U.S. Pat. No. 7,303,367, issued Dec. 4, 2007 (application Ser. No. 11/029,531 filed Jan. 5, 2005), entitled "Lock Nut System"; U.S. Pat. No. 7,559,135, issued Jul. 14, 2009 (application Ser. No. 11/341,948 filed Jan. 27, 2006), entitled "Method and Apparatus for Preloading a Bearing"; and U.S. Pat. No. 7,389,579, issued Jun. 24, 2008 (application Ser. No. 11/354,513, filed Feb. 15, 2006), entitled "Method, Apparatus, and Nut for Preloading a Bearing", the entirety of which are incorporated herein by reference.

As depicted in FIGS. 1-8, for example, retaining nut 11 may be a locking nut as disclosed in co-owned U.S. Pat. No. 7,303,367 (application Ser. No. 11/029,531 filed Jan. 5, 2005), entitled "Lock Nut System"; U.S. Pat. No. 7,559,135, issued Jul. 14, 2009 (application Ser. No. 11/341,948 filed Jan. 27, 2006), entitled "Method and Apparatus for Preloading a Bearing"; and U.S. Pat. No. 7,389,579 (application Ser. No. 11/354,513, filed Feb. 15, 2006), entitled "Method, Apparatus, and Nut for Preloading a Bearing". In the conventional art, retaining nut 11 typically is used to secure a wheel (not shown) or hub assembly to a non-rotating axle or spindle 14. However, in aspects of the present invention, retaining nut 11 may be useful in varying the preload and/or endplay of bearing 16. Though bearing 16 is illustrated as a tapered roller bearing, aspects of the invention may be applied to other types of antifriction bearings for which it is desirable to provide preload and/or endplay, for example, spherical roller bearings, deep groove ball bearings, and the like.

Figure 8:
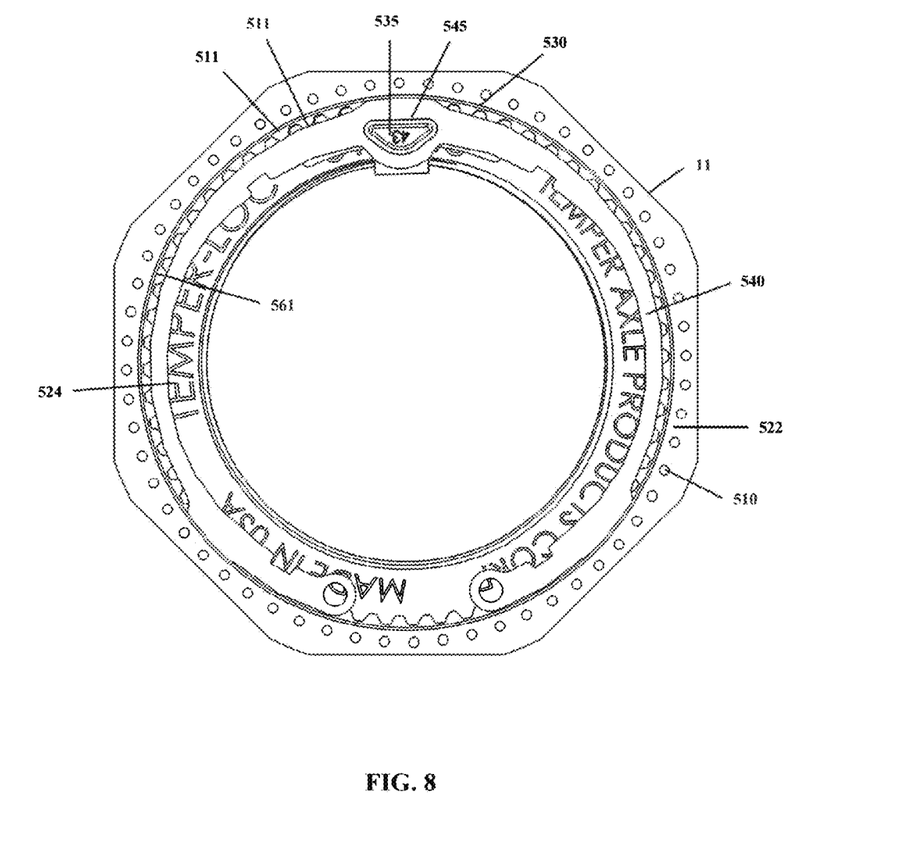
FIG. 8 is an elevational view of a lock nut system which includes a lock nut having a keeper and a keeper retaining member engaged with the nut according to an aspect of the present invention.
Figure 9:
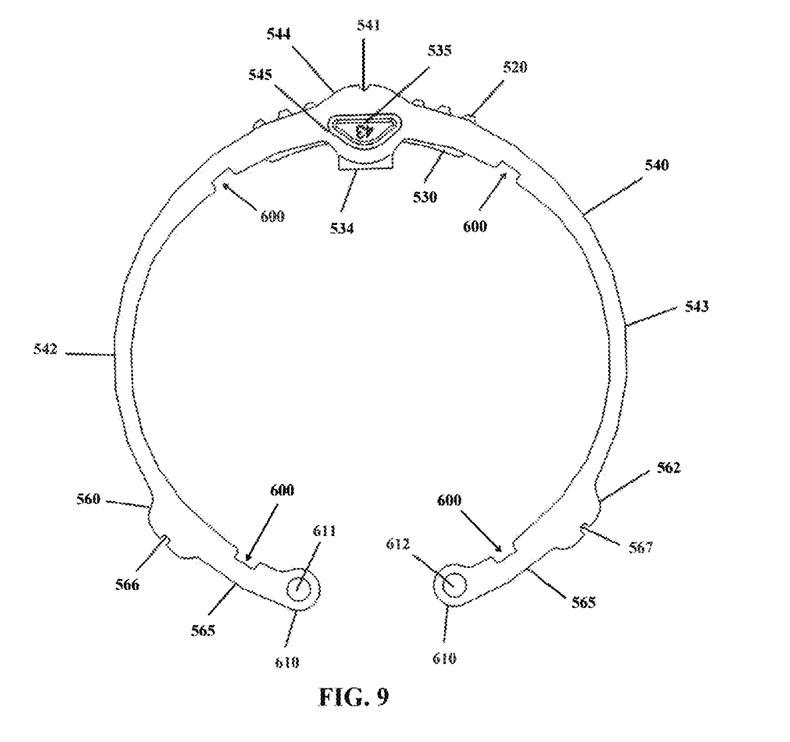
FIG. 9 is an elevational view of the keeper retaining member of FIG. 8.

As depicted in FIGS. 8-9, a keeper 530 is engageable with retaining nut 11 and is connected to a keeper retaining member 540. A projection 535 of keeper 530 extends through an opening 545 in retaining member 540 when connected. Projection 535 extends substantially perpendicular to a plane of retaining member 540. Projection 535 may be deformed by pressure applied on a top thereof (i.e. in a direction substantially perpendicular to the plane of retaining member 540) to connect retaining member 540 with keeper 530 similar to the way a rivet is utilized, as will be understood by those skilled in the art. Keeper 530 and retaining member 540 engage retaining nut 11. For example, keeper 530 includes keeper teeth 520 which are configured to engage engaging teeth 511 of retaining nut 11. Keeper 530 may also include an engaging member 534 which protrudes radially inwardly relative to retaining nut 11 to engage a shaft slot 5 (FIG. 4), keyway, groove or other engaging portion of a shaft (e.g., spindle 14). Thus, engaging member 534 may inhibit movement of keeper 530 relative to a shaft (e.g., spindle 14) and the engagement of engaging teeth 511 with keeper teeth 520 may inhibit movement of keeper 530 relative to retaining nut 11. Accordingly, movement of retaining nut 11 relative to the shaft is prevented or reduced. Keeper 530 and/or nut 11 may be molded or formed of powdered metal, for example.

Keeper retaining member 540 may engage a slot 561 of retaining nut 11. For example, a first leg 542 and a second leg 543 may be received in slot 561. For example, slot 561 may have a radial depth of about 0.050 inches. Further, a nose 544 of retaining member 540 may be received in slot 561. Retaining member 540 when received in slot 561 may align keeper 530 such that keeper teeth 532 are engaged with engaging teeth 511. Further, retaining member 540 provides resistance in an axial direction relative to retaining nut 11 thereby inhibiting movement of keeper 530 axially away from a shoulder 524 toward an outer surface 522.

Retaining member 540 may be elastically deformable to allow it to be received in slot 561. For example, first leg 542 and second leg 543 may be deformed (e.g., in a direction substantially perpendicular to the axis of retaining nut 11) toward one another prior to being inserted axially past outer surface 522 of retaining nut 11 to allow retaining member 540, and keeper 530 to be attached thereto. First leg 542 and second leg 543 may then be elastically returned toward slot 561. First leg 542 may also include a gripping member 568 and second leg 543 may include a second gripping member 569. The gripping members are substantially parallel to one another and are aligned at about 90 degrees from a plane of retaining member 540. A user may move the legs (i.e., first leg 542 and second leg 543) toward one another as described above to allow the retaining member to be received in slot 561. In one example, a user may use a tool (e.g., a tool made for this specific purpose or a type of pliers such as needle nose pliers) which is inserted into openings 611 and 612 (FIG. 5) to allow the tool to grip the legs to move ends 610 toward one another thereby allowing the legs to be inserted into slot 561. In an example a tool, such as a tool 7 disclosed in co-owned U.S. Pat. No. 9,599,164 issued on Mar. 21, 2017, entitled "Systems and Methods for Preloading a Bearing", could be utilized to grip the legs.

Also, first leg 542 may include a protruding portion 560 which protrudes radially relative to a rounded portion 565 of retaining member 540. Similarly, second leg 543 may include a protruding portion 562. Protruding portion 560 and protruding portion 565 may extend into slot 561 to engage retaining member 540 with slot 561. Further, protruding portion 560 may include a groove 566 and protruding portion 562 may include a groove 567. For example, retaining member 540 may be formed of stamped sheet metal, and may have a thickness in a range between 0.040-0.050 inches, as will be understood by those skilled in the art. Alternatively, retaining member 540 could be formed of other materials (e.g., powdered metal) and/or formed in other shapes to allow retaining member 540 to be received in slot 561 and to be connected to keeper 540 via projection 535. Further, keeper 530 may be formed or molded of powdered metal, for example. Alternatively, keeper 530 and retaining member 540 could be formed integral or monolithic relative to one another.

Further, keeper 530 and/or nut 11 may be fabricated from any one or more of the structural metals, for example, carbon steel or stainless steel. Nut 11 may be fabricated by machining from a billet or plate, by forging or casting and then finished machining, or fabricated by conventional powder metallurgy techniques. In one aspect, when formed by powder metallurgy, the material may be FC 0208, or its equivalent. Nut 11 may also be surface hardened for example, induction hardened, carburized, or nitrided, among other surface hardening methods; in one aspect, the exposed surfaces on end 241 of nut 220 may be hardened, for example, induction hardened.

Returning to FIGS. 1-5, preload apparatus 20 includes an attaching mechanism, such as a shaft or rod 40 engageable with spindle 14 by a collar 46, and a press mechanism 44 for providing a compressive load to bearing 16. In addition, aspects of the invention provide means for monitoring the preload on the bearings to, for example, ensure that the desired preload is provided, in contrast to the unreliable and often inaccurate assumed preloading of the prior art.

Rod 40 may be configured to attach to exposed end 13 of shaft 14, for example, by collar 46, though other attachment means may be used. Press mechanism 44 may include an adjustment handle 50 which may be connected to rod 40 to facilitate rotation of rod 40 and/or collar 46 to connect press mechanism 44 to shaft 14. Such connection may also be performed by a servo motor or other mechanism for rotating rod 40 and/or collar 46 to connect press mechanism 44 to shaft 14. Press mechanism 44 may provide a compression force via a nut as described in co-owned U.S. Pat. No. 8,316,530 relative to nut 48 depicted therein or via a hydraulic, pneumatic or other means of providing such a force.

As shown in FIGS. 3-7, press mechanism 44 includes loading arms 210. A compressive load from press mechanism 44) is transmitted to bearing 16, and to bearing 18, by loading arms 210. Further, loading arms 210 work in conjunction with retaining nut 11 to provide a load to outboard bearing 16 (e.g., an inner race 15 thereof). Retaining nut 11 may have a recess that exposes the surface of inner race 15 and permits contact by, for example, loading arms 210. For example, as depicted in FIGS. 1-7, nut 11 may have a bottom curve or recessed portion 111 such that a bottom end of nut 11 has a smaller diameter than the remainder thereof. Loading arms 210 may thus transmit the compressive load from press mechanism 44 (i.e., around nut 11) to bearing 16. In an unillustrated example, bearing 16 could be exposed thereby allowing press mechanism 44 to be used with a conventional axle nut, as shown for example in FIG. 3 of co-owned application, U.S. Pat. No. 7,389,579 issued Jun. 24, 2008 (application Ser. No. 11/354,513, filed Feb. 15, 2006), and entitled "Method, Apparatus, And Nut For Preloading A Bearing". However, when bearing 16 would be concealed by such a conventional axle nut, retaining nut 11 may be used instead thereof according to aspects of the invention.

As depicted in FIGS. 3-7, for example, loading arms 210 extend from a base 400 and include a first arm 212 and a second arm 213. In this aspect of the invention, arms 210 are adapted to transmit a load from press mechanism 44 to bearing 16. In one aspect, arms 210 may be moveable or deflectable to facilitate assembly of arms 210 into engagement with bearing 16. For example, arms 210 may include a modification to arms 212 and 213 that permits arms 212 and 213 to deflect to avoid interference with nut 11.

Arms 210 may be pivotally mounted to base 400 or another portion of press mechanism 44 (to allow lateral movement of the arms such that the arms may engage bearing 16). Arms 210 may include projections 225, 226, respectively, for example, arcuate projections adapted to engage the arcuate shape of bearing 16 (e.g., an inner race thereof) as described previously relative to extensions 212, 213 of co-owned U.S. Pat. No. 8,650,757 issued on Feb. 18, 2014 (U.S. Ser. No. 13/683,571, filed Nov. 21, 2012 for "Systems and Methods for Preloading a Bearing and Aligning a Lock Nut". Arcuate projections 225, 226 may be radiused to provide the same curvature of bearing 16, for example, a radius of between about 1¼ inches and about 3 inches. The shape of arms 210 including projections 225, 226 may ensure that the compressive load applied by press mechanism 44 is transmitted to bearing 16 and not borne by nut 11. Minimizing or preventing contact between extensions 212, 213 and nut 11 also permits nut 11 to be freely rotated without contact with extensions 212, 213.

Although only two arms 212, 213 are illustrated in FIGS. 3 and 10-11, according to one aspect of the invention, two or more arms 212, 213 may be mounted to, or otherwise extend from, base 400 of press mechanism 44. For example, three or more extensions arms may be provided, for example, uniformly spaced about base 400 about an axis coaxial to an axis of shaft 14 and/or rod 40. In one aspect of the invention, arms 212, 213 may include spring-loaded mountings to base 400 whereby arms 212, 213 are biased into a position of engagement with race 15.

Press mechanism 44 may include a wrench 230 having teeth 235 engageable with teeth 511 of nut 11 to allow a rotation of nut 11 via a controller (not shown) controlling a rotation of nut 230. Wrench 230 may surround collar 46 and may be extendable away from base 400 toward nut 11 and retractable in an opposite direction. Teeth 235 may engage teeth 511 when wrench 230 is extended to contact nut 11. For example, wrench 230 may be driven by a servo motor coupled to the controller to control rotation of wrench 230 and thus nut 11 while wrench 230 may also be extendable to engage nut 11 via a servo motor coupled to, and controlled by, the controller. The rotation and extension of wrench 230 could also be driven by a hydraulic or pneumatic system including a pump controller by the controller utilizing a rack-and-pinion system, for example.

Press mechanism 44 may also include a housing 430 having slot optical sending units 410 and configured to help a user align shaft slot 5 (FIG. 3) of spindle 14 with press mechanism 44, for example, as depicted in FIGS. 1-4. Optical sending units 410 may provide a high intensity light source, such as a laser beam.

High intensity light beams, such as laser beams, emitted from the sending units may be aligned with opposite circumferential sides of shaft slot 5, for example, by rotating housing 430 relative to base 400. A locking mechanism 412 may be engaged by a user when beams of light produced by the sending units are aligned as described to maintain housing 430, and thus the beams of light, in a particular position.

Press mechanism 44 may also include locating optical sending units 420 located on circumferential opposite sides of housing 430 of press mechanism 44 relative to optical sending units 410. Locating light or laser beams produced by locating optical sending units 420 may be utilized by a user as a reference point relative to retaining nut 11. In particular, retaining nut 11 may include one or more markings 510 corresponding to one or more roots 512 (i.e., low points equidistant between each pair of engaging teeth) of engaging teeth 511 thereof as depicted in FIG. 8. For example, the markings may be circular indentations in the nut. The location of such markings on outside surface 522 of nut 11 allows a user to selectively rotate the nut relative to the locating laser light or beams produced by locating optical sending units 420 (e.g., when pressure is applied to bearing 16 by press mechanism 44 to allow rotation of nut 11) to an engaging position where the locating laser beams are at desired positions relative to one or more of markings 510. In such position, engaging teeth 511 may be properly engaged with keeper teeth 520 such that radially inner side 534 engages shaft slot 5 of spindle 14, i.e., after preload apparatus is removed and keeper 530 and keeper retaining member 540 engage nut 11. Further, keeper retaining member 540 may include a notch 541 in a nose 544 thereof with the notch being located at about a geometrical central point of keeper retaining member 540 (e.g., on an axis of symmetry thereof) such that an equal amount of retaining member 540, such as first leg 542, is one side thereof while the remainder of retaining member 540, such as second leg 543, is on another side thereof. Further, keeper 530 may be centered on keeper retaining member 540 such that a central engaging tooth (e.g., a central engaging tooth 570 as disclosed in co-owned U.S. Pat. No. 8,650,757) is aligned with notch 541. Also, retaining member 540 may be placed in slot 561 such that the central engaging tooth engages a tooth root aligned with a marking of markings 510 to which notch 541 is aligned. Alternatively, markings 510 could correspond to a different feature of nut 11 (i.e., besides the roots between teeth 511) to facilitate the engagement of nut 11 with keeper 530 and/or keeper 530 with shaft slot 5 of spindle 14.

In another example, an optical receiver may receive a reflection of light produced by optical sending units 410 and/or 420 to determine a point that the laser beams produced thereby contact nut 11 and the locations of the markings on nut 11. Press mechanism 44 may include, or be connected to, a controller coupled to optical sending units 410 and/or 420 and the receiver, along with wrench 230 and/or a separate wrench (not shown) usable to rotate nut 11. The controller may cause the rotation of nut 11 to a desired preload and based on the locations of the light or laser beam(s) to allow the proper engagement of engaging teeth 511 with keeper teeth 520 as described above, and such that radially inner side 534 of keeper 530 engages shaft slot 5 when retaining member 540 is placed in slot 561 as described above.

Press mechanism 44 may be any apparatus that is configured to provide a compressive load (e.g., utilizing nut 48 as disclosed in patent '530) to outboard bearing 16 (e.g., an inner race thereof). Further, press mechanism 44 may include a load sensor or any means for monitoring the compressive load transferred to bearing 16. For example, an indication of the compressive load transferred by press mechanism 44 may be provided mechanically, for example, by compression springs having a known spring constant, for example, coil springs or disc springs, and a deflection indicator, for example, a dial indicator, as is known in the art. In this aspect, a dial indicator may be mounted to detect and indicate the compression of one or more springs positioned in press mechanism 44 due to the advancement of nut 48, and the compression load calculated from the deflection indicated and the known spring constant of the springs used. This aspect of the invention may provide a reliable and repeatable means for monitoring the preload provided to inner race 15 of outboard bearing 16. The load sensor may be wired to an appropriate controller or processor and display to, for example, provide a digital readout of the compressive load to the mechanic operating preload device 20. The transmission of signals from the sensor may also be practiced wirelessly, for example, by means of an RF signal. This aspect of the invention may also provide a reliable and repeatable means for monitoring the preload provided to bearing 16.

In another aspect of the invention, press mechanism 44 may include at least one fluid, for example, a gas, such as air; or a liquid, such as, water, oil, or hydraulic fluid, the pressure of which can be detected and monitored, for example, by means of a pressure gage, pressure sensor, or a mechanical indicator. In one aspect not illustrated, the fluid pressure may comprise the source of compressive load on bearing 16. In such an embodiment, the fluid may be retained in a cavity for example, a deformable cavity, such as a bladder or hose, for example, an air spring; or a cavity having rigid walls and at least one moveable wall, for example, as in a cylinder and piston. In one aspect, the deformable cavity or air spring may be made of molded rubber, somewhat like an inner tube.

When air is used as the fluid, the air may be provided by conventional "shop air" at a pressure of about 100 psig. The pressure of the fluid in the deformable cavity may be monitored by means of sensor or pressure gage, for example, a pressure gauge mounted to a nozzle inserted the wall of the deformable or non-deformable cavity. In one aspect, a mechanical indicator may be activated, for example, a lever deflected when the desired fluid pressure in press mechanism 44 is reached advising the mechanic.

As discussed previously, press mechanism 44 and rod 40 thereof may be adapted to attach to exposed end 13 of spindle 14. Though this may be effected by many conventional means, including welding and mechanical fasteners, in the aspect of the invention shown in FIGS. 1-4, rod 40 is attached to end 13 of spindle 14 by collar 46. In the aspect shown, collar 46 is mounted to rod 40 by means of internal threads 47 in collar 46 that thread onto external threads 49 on rod 40. Collar 46 also includes a second set of internal threads 45 that engage external threads 51 on spindle 14. In one aspect, only 2 or 3 external threads 51 need be engaged by collar 46. According to one aspect, multiple collars 46 having varying diameters may be provided to accommodate varying diameters of spindle 14. Each of these collars 46 may be adapted to engage external threads 49 on rod 40.

Rod 40, housing 42, collar 46, nut 48, arms 50, housing 52, piston 54, and housing 42 may be fabricated from any conventional structural metal, for example, iron, steel, stainless steel, aluminum, titanium, nickel, magnesium, brass, or bronze, among others.

In one aspect of the invention, preload apparatus 20 may be used to apply and monitor a preload to outboard bearing 16. In a typical procedure, a wheel (not shown) may be dismounted from hub assembly 10, for example, which was mounted to studs on hub 12, as exemplified by stud 100 in FIGS. 1-3. Nut 11 may be loosened or hand tightened prior to mounting apparatus 20, though any light load on nut 11 will typically be relieved with application of tension to spindle 14 by means of rod 40.

For example, a torque wrench and socket may be utilized to torque nut 11 and seat the bearings. The nut may then be tightened to a "hand tight" position followed by loosening of the nut by backing it off about ¼ turn. Alternatively, such tightening and loosening may be done using servo controlled wrench tools (e.g., wrench 230) which perform such tasks in response to a command by a user or which may be automatically performed in response to a set of instructions programmed and stored in the controller or a second controller or computer storage coupled to the controller.

Figure 5:
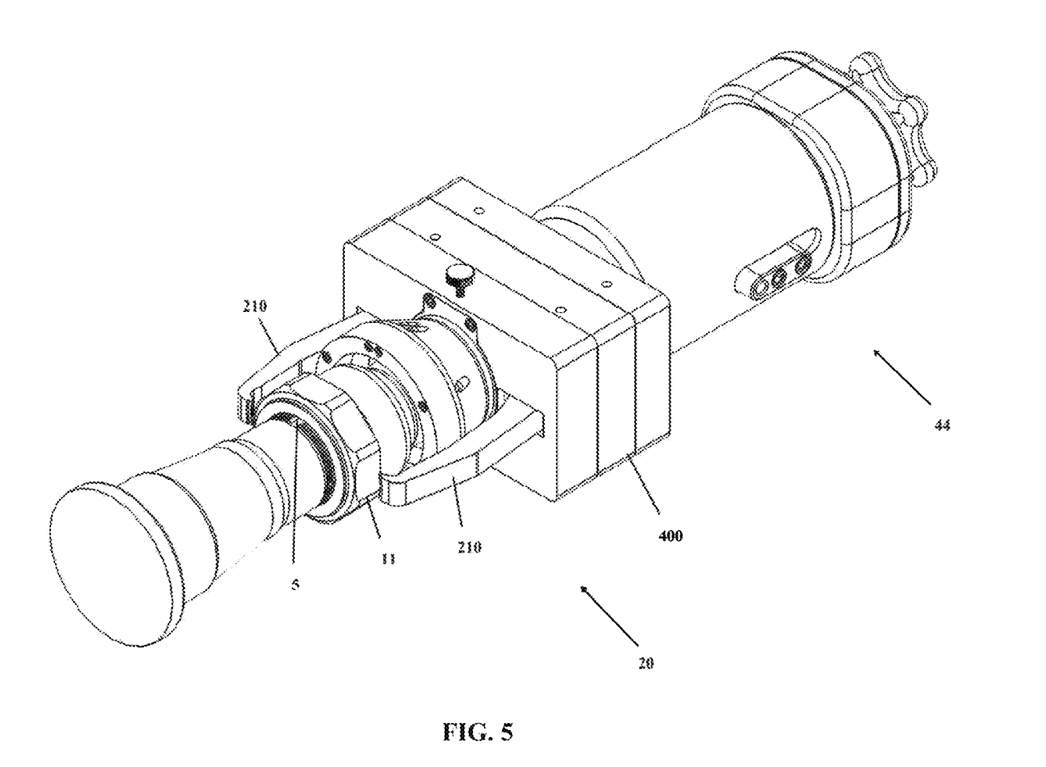
FIG. 5 is perspective view of the assembly of FIG. 1 with portions of the wheel hub assembly removed.
Figure 6:
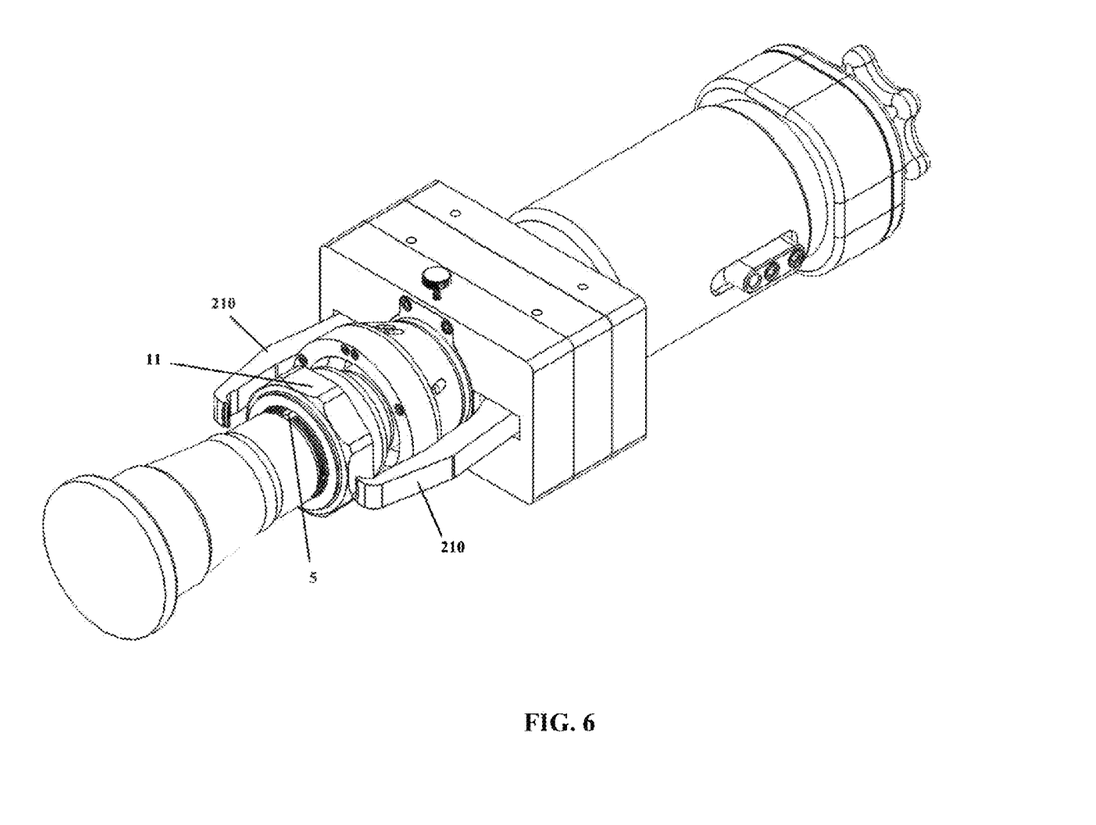
FIG. 6 is a perspective view of the apparatus of FIG. 5 with extending arms of the preload apparatus extended relative to the depiction in FIG. 5.
Figure 7:
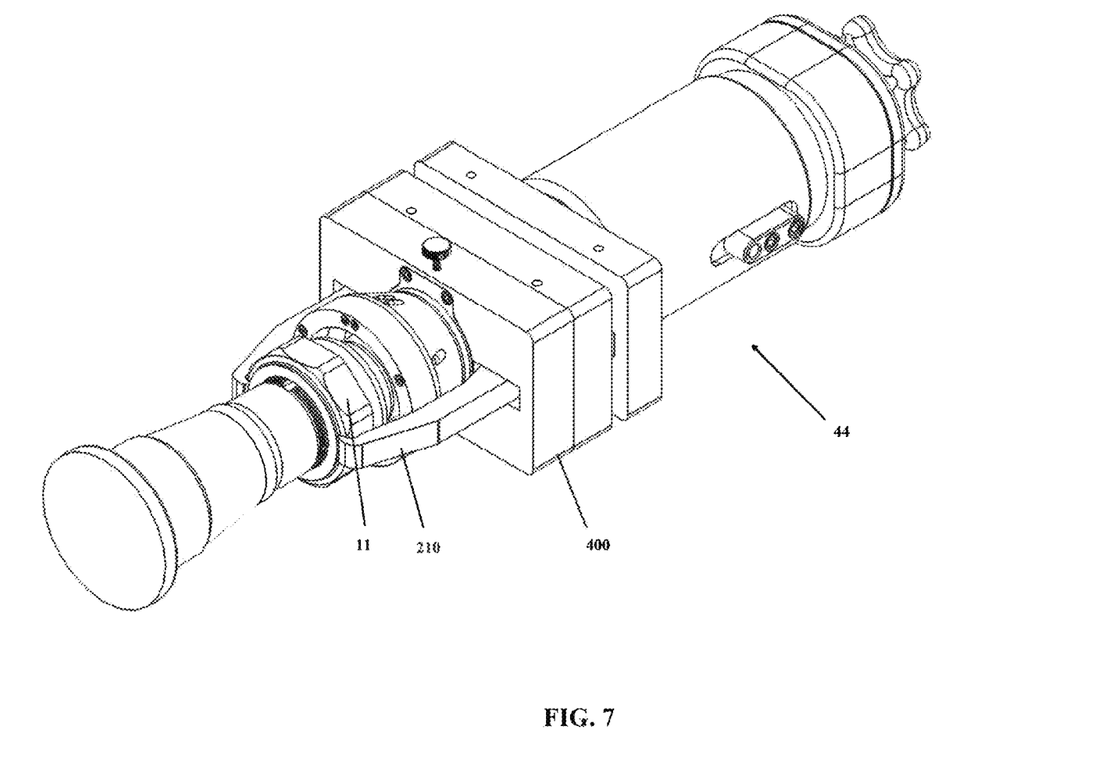
FIG. 7 is a perspective view of the apparatus of FIG. 6 with the extending arms extended further around a lock nut to engage a bearing.

Apparatus 20 may then be mounted to hub assembly 10 by attaching rod 40 to spindle 14 by means of collar 46. Arms 210 may then be automatically advanced by press mechanism 44 such that the arms are brought into contact with bearing 16 (e.g., an inner race thereof) as depicted in FIGS. 5-7 which a movement of arms 210 toward bearing 16 and around nut 11. FIG. 7 shows a same position of arms 210 as FIG. 3. In one example, press mechanism may then apply 4000 lbs force to the bearings.

Such force may be generated and transmitted by press mechanism 44 by any of various mechanisms including those described in co-owned U.S. Pat. No. 8,316,530 relative to press mechanism 44. In one example, disclosed in this patent the loading of bearing 16 may be initiated by advancing, that, is tightening, a nut (such as nut 48 described in this patent), against housing 52 via bearing 62, for example, by means of arms 50. The build up of pressure in cavity 56 (as indicated by pressure indicator 60) may be monitored by a mechanic, e.g., using a pressure indicator as described in the patent.

Pressure may be applied by press mechanism 44 until a target pressure is achieved. The hub assembly may be rotated at least once to provide proper seating of the rollers in bearing 16. Alternatively, the bearings could be automatically rolled utilizing a separate bearing rolling mechanism not described herein. For example, rod 40 and handle 50 may be rotated three revolutions and such handle may then be counter-rotated slightly to arrive at a desired pressure as indicated on a pressure sensor (not shown).

A desired preload may then be provided (e.g., automatically controlled by the controller) by press mechanism 44 to the bearings. The controller may cause a servo motor to actuate wrench tools (e.g., wrench 230) and torque the nut (e.g., nut 11) to "finger tight" or wrench 230 could be controlled by a controller to provide such a preload. If endplay is desired, a servo motor (e.g., coupled to wrench 230 or a separate servo wrench) may back the nut off to a desired endplay setting. Upon completion of the preloading, apparatus 20 may be removed from wheel hub assembly 10, and keeper 530 and retaining member 540 may be engaged with retaining nut 11 and spindle 14, such that keeper teeth 520 engage teeth 511 of nut 11 and engaging member 534 of keeper 530 engage shaft slot 5 of spindle 14.

The preloading of the bearings as described above is advantageous relative to endplay adjustment but was rarely recommended prior to the present invention due to the difficulty of creating and verifying a correct preload site. A load sensor such as a pressure indicator or gauge (not shown) may be used along with the selective positioning of retaining nut 11 on spindle 14 (e.g., using locating laser or light beams produced by locating optical sending units 420 and markings 510; or wrench 220 controlled by a controller) provide for a repeatable correct and accurate preload setting.

In another example, press mechanism 44 may apply pressure by fluid pressure to provide the compressive load to bearing 16. In this aspect of the invention, the compressive force provided by the nut described relative to patent '530 may be replaced by fluid pressure provided to press mechanism 44. For example, as depicted in FIGS. 1-4, press mechanism 44 includes a housing 52 and a movable piston 54 mounted for axial movement in housing 52. In this aspect of the invention, an internal cavity 56 is provided in housing 52. Internal cavity 56 is at least partially filled, for example, substantially completely filled, with a fluid, for example, a gas, air, oil, water, and the like, that produces a hydrostatic pressure when fluid pressure is provided to internal cavity 56 receiving piston 54 via a pump (not shown), pressurized shop gas, or otherwise. Such pressure may cause movement of piston 54 which may be mechanically coupled to arms 210 to provide the load to bearing 16. A reduction in such pressure may cause a retraction of piston 54 and/or a reduction in the load.

Piston 54 may be provided with one or more seals (not shown), for example, one or more wiper seals, to minimize or prevent the leakage of fluid from housing 52. Also, cavity 56 bounded by housing 52 may provide clearance for the displacement of piston 54 therein.

In one aspect, the fluid pressure (e.g., to cavity 56 of housing 52 of press mechanism 44) may be provided by a conduit or hose. The hose may supply fluid, for example, hydraulic fluid, from a pressurized supply, for example, a pump controlled by a controller. The fluid supplied to the hose may vary from 500 to 3000 psig.

Such a press mechanism applying pressure by fluid pressure may be used to automatically regulate the compressive load on bearing 16, for example, by regulating the pressure introduced to press mechanism 44 through the hose. In one aspect, the invention may include an automatic controller, for example, a PID controller, personal computer, or PLC controller adapted to regulate the pressure in the hose. For example, the predetermined preload and the parameters of the bearing being loaded may be entered into the controller and, after mounting a rod similar to rod 40, housing 42 and a press mechanism to bearing 16 (e.g., an inner race thereof), the controller may automatically ramp up the fluid pressure to provide the desired preload or to verify an existing preload. This aspect of the invention may be suitable for production line applications, among others.

In one aspect, the fluid provided by the hose may be provided by a pressure increasing device, for example, a pressure intensifier, that is, a device that converts one pressure to a higher pressure. For example, the pressure-increasing device may be provided with a pressure supply of, for example, 100 psig (for instance, shop air) and increased to, for example, 2000 psig hydraulic fluid, which is then supplied to the hose. Other sources of high-pressure fluid may be provided according to aspects of the invention.

In an example, press mechanism 44 may include a switch 300 for use in controlling the load on bearing 16 as described for example in co-owned U.S. Pat. No. 9,764,453 issued on Sep. 19, 2017, entitled "System and Methods for Preloading a Bearing". Such a switch may be in fluid communication with cavity 56 and thereby a source of fluid (e.g., via the hose described above) utilized to provide fluid pressure to apply the load to the bearing. The switch may be coupled to a controller or may include a controller therein to regulate the compressive load on bearing 16, for example, by regulating the pressure (e.g., hydraulic or air) introduced into cavity 56 to drive piston 54 as described above.

Aspects of the invention may also be used to evaluate the preload or endplay on an existing bearing or bearing assembly. For example, an existing truck hub assembly may be evaluated for its existing preload and compared to the desired preload, and, if necessary, adjusted accordingly. First, the truck may be jacked up, if needed. (The hub may be allowed to cool, if necessary). Apparatus 20 may then be mounted to bearing 16 and spindle 14 (with reference to FIGS. 1-3) and the press mechanism 44 actuated to introduce tension to spindle 14 and compression to bearing 16. (The wheel may be removed.) Press mechanism 44 may be regulated to, for example, vary the fluid pressure, to gradually increase the preload on bearing 16. While the load is increased, a mechanic can repeatedly check the load on or the "tightness" of nut 11. When nut 11 begins to loosen, the existing preload on bearing 16 has been met or exceeded. A comparison of the actual preload indicated by press mechanism 44, for example, the fluid pressure, with the desired preload can then be made. Any adjustments to the preload, either higher or lower, can be made according to the procedures described above and in U.S. Pat. No. 7,389,579.

Although aspects of the present invention were described above with respect to their application to wheel hub assemblies, for example, truck wheel hub assemblies, it is understood that aspects of the present invention may be applied to any vehicle, machine, or component having at least one bearing. Further, although press mechanism 44 is described above as applying a compressive load to an inner race of a bearing, such load could be applied elsewhere to the bearing or wheel assembly 10 such that a frictional or other load on a retaining nut is reduced to allow rotation of a retaining nut. Such rotation may allow teeth of the nut and teeth of a keeper to be aligned with each other to allow engagement of a shaft engaging portion of the keeper with a shaft, (e.g., a shaft slot thereof) to inhibit rotation of the nut relative to the shaft.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

The invention claimed is:

1. An apparatus for providing a load on a bearing mounted to a shaft, the apparatus comprising:
    an attaching member releasably connectable to a circumferential outside surface of an exposed end of a threaded shaft;
    a press mechanism coupled to said attaching member, said press mechanism configured to provide a compressive load to the bearing; and
    wherein a proximal direction extends toward the press mechanism from the attaching member, and a distal direction is opposite from the proximal direction and extends toward the attaching member from the press mechanism;
    said press mechanism having arms extendable in the distal direction past the attaching member to directly contact the bearing to apply the compressive load;
    said press mechanism comprising a wrench movable by the press mechanism toward a lock nut on the shaft in the distal direction such that the wrench engages the nut, and
    said press mechanism configured to rotate the nut by causing a rotation of said wrench when said wrench engages said lock nut when said attaching member is connected to the shaft.

2. The apparatus of claim 1 further comprising a controller configured to control a motor to cause the rotation of said wrench to rotate the nut on the shaft.

3. The apparatus of claim 2 wherein said wrench is retractable away from the nut by the press mechanism.

4. The apparatus of claim 1 further comprising a drive mechanism configured to move said wrench toward the nut and configured to rotate the nut as controlled by a controller.

5. The apparatus of claim 1 wherein said wrench surrounds said attaching member.

* * * * *